US012136443B1

(12) United States Patent
Harney et al.

(10) Patent No.: US 12,136,443 B1
(45) Date of Patent: Nov. 5, 2024

(54) SYSTEM, METHOD, AND COMPUTER PROGRAM FOR AUTOMATICALLY GENERATING AN AUDIO TRACK FOR A VIDEO BASED ON A CURRENT STATE OF THE VIDEO

(71) Applicant: GoAnimate, Inc., San Mateo, CA (US)

(72) Inventors: Matthew Harney, Bangkok (TH); Gary Alan Lipkowitz, Brisbane, CA (US)

(73) Assignee: GoAnimate, Inc., San Mateo, CA (US)

( * ) Notice: Subject to any disclaimer, the term of this patent is extended or adjusted under 35 U.S.C. 154(b) by 28 days.

(21) Appl. No.: 18/210,430

(22) Filed: Jun. 15, 2023

Related U.S. Application Data

(60) Provisional application No. 63/445,975, filed on Feb. 15, 2023.

(51) Int. Cl.
| | | |
|---|---|---|
| *G11B 27/036* | (2006.01) | |
| *G06F 16/68* | (2019.01) | |
| *G06F 16/75* | (2019.01) | |
| *G06F 16/78* | (2019.01) | |

(52) U.S. Cl.
CPC .......... *G11B 27/036* (2013.01); *G06F 16/686* (2019.01); *G06F 16/75* (2019.01); *G06F 16/7867* (2019.01)

(58) Field of Classification Search
CPC ... G11B 27/036; G06F 16/75; G06F 16/7867; G06F 16/686
See application file for complete search history.

(56) References Cited

U.S. PATENT DOCUMENTS

| | | | | |
|---|---|---|---|---|
| 11,315,602 | B2 * | 4/2022 | Wu | H04N 21/8146 |
| 11,748,988 | B1 * | 9/2023 | Chen | G06F 16/78 |
| | | | | 386/241 |
| 12,081,827 | B2 * | 9/2024 | Black | G06F 16/7867 |
| 2014/0238055 | A1 * | 8/2014 | Dobbs | F24F 11/81 |
| | | | | 62/89 |

* cited by examiner

*Primary Examiner* — Mishawn N. Hunter
(74) *Attorney, Agent, or Firm* — Lessani Law Group, PC

(57) ABSTRACT

This disclosure relates to a system, method, and computer program for automatically generating audio tracks for a video based on a current state of the video. The system provides a novel way to produce one or more audio tracks for a video. The system enables a user to enter a request for an audio track. In response to receiving the request, the system identifies the current state of a video, including the assets, scenes, and timelines in the video. Attributes of the current state of the video are then used to guide the output of machine-learning audio-generation models, which generate one or more audio clips for the video. In this way, visual assets added to a video can be used to guide the output of machine learning models that generate audio for the video. The sound clips produced by the machine-learning modules are then mixed to produce an audio track for the video.

18 Claims, 4 Drawing Sheets

SYSTEM, METHOD, AND COMPUTER PROGRAM FOR AUTOMATICALLY GENERATING AN AUDIO TRACK FOR A VIDEO BASED ON A CURRENT STATE OF THE VIDEO

RELATED APPLICATIONS

This application claims the benefit of U.S. Provisional Application No. 63/445,975 filed on Feb. 15, 2023, and titled "Automatic Audio Track Synthesis," the contents of which are incorporated by reference herein as if fully disclosed herein.

FIELD OF THE INVENTION

This invention relates generally to video generation and, more specifically, to automatically generating an audio track for a video based on a current state of the video.

BACKGROUND

Audio creation and editing is a time consuming task for video production. A typical workflow for creating a soundtrack for a video is as follows:
1. Production: An initial recording of one or more audio clips for the soundtrack. For example, this may be a field recoding. This is typically noisy (e.g., unwanted background sounds) and not of sufficient quality to deploy in a video.
2. Post-Production Dialog/Effect Replacement: In this step, field dialog and/or sound effects in the production clips are replaced with either dialog/effects from a library or dialog/effects re-recorded in a controlled environment. These steps are known as ADR (Dubbing) and Foley.
3. Post-Production Editing: In this step, any additional edits to the audio clips are performed.
4. Post-Production Sound Mixing: In this step, audio clips are mixed to form a soundtrack, music is added to the soundtrack, and audio imaging (e.g., stereo, surround sound) is performed.

All of these steps take a long time and require significant expertise. Therefore, there is strong demand for a solution that significantly simplifies and accelerates the process of generating a video soundtrack.

SUMMARY OF THE INVENTION

This disclosure relates to a system, method, and computer program for automatically generating an audio track for a video. The system includes a plurality of machine-learning audio generation models. The models are trained to generate audio clips in response to receiving attributes of visual assets in a video production workspace. The system also includes a machine-learning audio mixing module that intelligently mixes the audio clips to create an audio track for the scene. A workflow for creating a soundtrack using this system may comprise the following:
1. User adds visual assets to a video scene. For example, a user may add characters and images of objects to a scene.
2. User requests a soundtrack for the scene. User may enter a description of the desired soundtrack (optional).
3. The machine-learning audio generation models generate audio clips based on the visual assets added the scene and any description entered by the user. The audio mixing module intelligently mixes the audio clips into a soundtrack.
4. The system presents the soundtrack to the user. The user is able to further refine the soundtrack by requesting further refinements.

This workflow is significantly simpler and faster than a traditional sound-creation workflow. The user does not need to work with individual sound clips. Instead, the user can work at an executive level using visual and textual representation or descriptions of the required soundscapes, and the system automatically generates the audio tracks. The user does not require expertise in generating, editing, and mixing audio clips.

To create an audio track, the system identifies the current state of a video, including the assets, scenes, and timelines in the video. Attributes of the current state of the video are then used to guide the output of machine-learning audio-generation models, which generate one or more audio clips for the video. The audio clips are then mixed to produce an audio track for the video.

In one embodiment, a method for automatically generating audio tracks for a video based on a current state of the video comprises the following steps:
providing a multimedia video production workspace for creating videos;
enabling a user to add a plurality of multimedia assets for a video to the multimedia workspace;
providing an audio-track generation platform comprising a plurality of machine-learning models trained to generate audio clips in response to receiving attributes of assets in the video production workspace; and
automatically generating an audio track for a video based on a current state of the video by performing the following:
  identifying a current state of a video, including identifying all the assets in the current state of the video;
  identifying attributes of the assets in the current state;
  identifying one or more machine learning models in the audio-track generation platform to use to generate the audio track;
  applying the identified machine-learning model(s) to the attributes of the assets in the current state to obtain a plurality of audio clips corresponding to the assets in the current state;
  mixing the plurality of audio clips to create an audio track for the video;
  presenting the audio track to the user; and
  enabling the user to add the audio track to the video.

DETAILED DESCRIPTION OF THE PREFERRED EMBODIMENTS

This disclosure relates to a system, method, and computer program for automatically generating an audio track for a video based on a current state of the video. The method is performed by a computer system ("the system").

1. Definitions

An asset is an element of a video. An asset may be any number of multimedia types, such as audio, video, voice, images, animations, text. Assets also may include proprietary video asset types (as might be known to a video production software), such as characters, character actions, backgrounds, and props.

A scene is a virtual stage in a user interface of a video production software on which a user can arrange assets for a video. A video typically comprises a series of scenes.

2. Overview

The system provides a novel way to produce an audio track for a video. The system enables a user to enter a request for an audio track. In response to receiving the request, the system identifies the current state of a video, including the assets, scenes, and timelines in the video. Attributes of the current state of the video are then used to guide the output of machine-learning models trained to generate audio clips ("audio-generation models"). In this way, visual assets added to a video can be used to guide the output of machine learning models that generate audio for the video. The audio-generation models may produce one or more sound clips for the video. The sound clips produced by the machine-learning modules are then mixed to produce an audio track for the video.

3. Example Software Architecture

Figure 1:
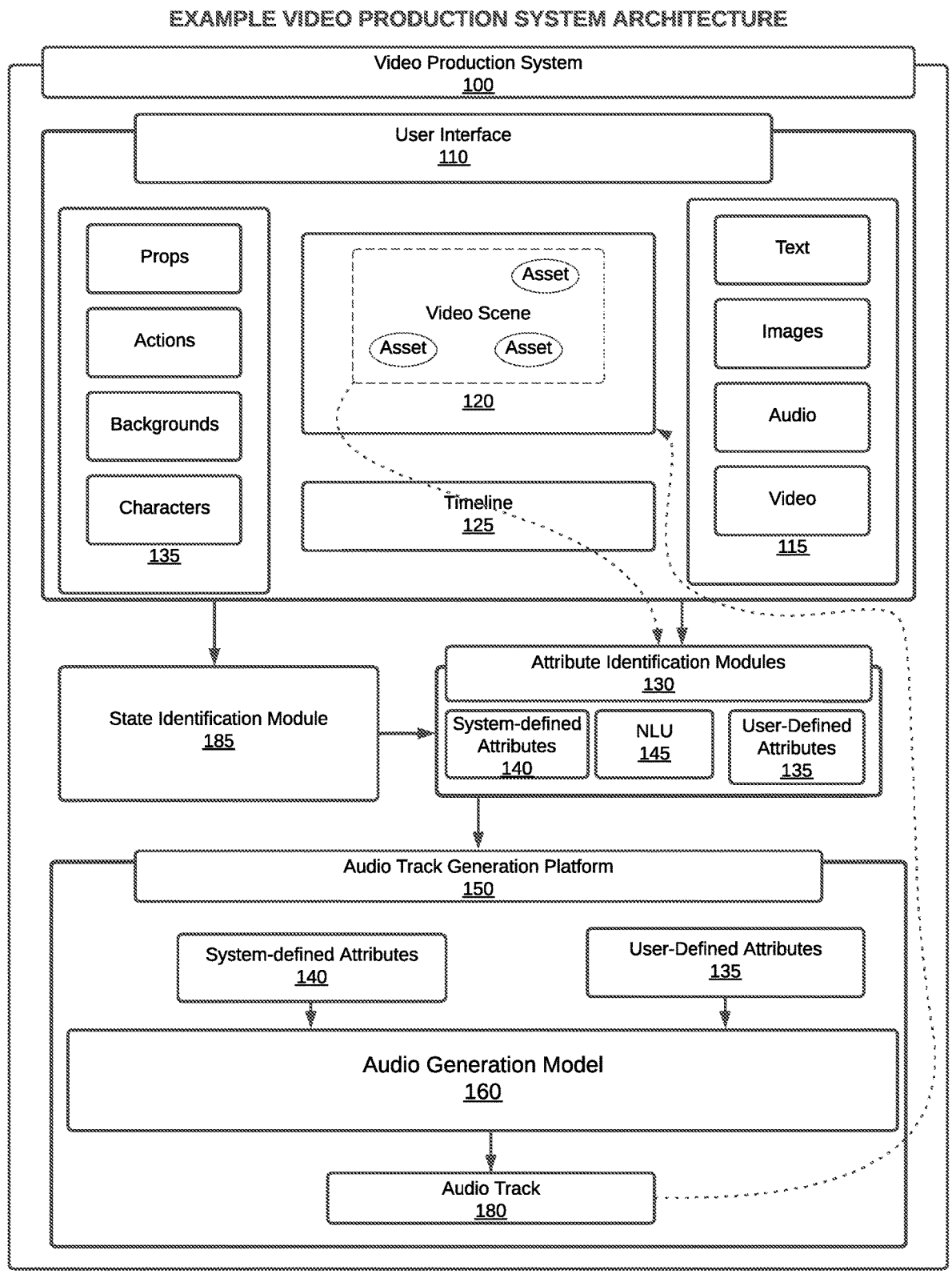
FIG. 1 is a block diagram that illustrates an example software architecture of a video production system according to one embodiment.

FIG. 1 illustrates an example architecture for the system. The system 100 includes a user interface module 110 that generates a video production workspace 120 in which a user can produce and edit videos. The workspace includes a timeline 125 that illustrates the order and time in which scenes in the video appear. A user adds assets to the workspace to create scenes for the video. The type of assets that a user is able to add include both generic media forms 115, such as text, audio, images, animation, and video, and proprietary video asset types 135, such as characters, character actions, backgrounds, and props.

The system includes a State Identification Module 185 that identifies a current state of the video. This including identifying each scene created for a video and then, for each scene, identifying the assets in the scene and the timeline associated with the scene.

The system also includes Asset Identification Modules 130. The Asset Identification Modules include one or more modules that identify system-defined attributes 140, such as metadata tags, of each asset in the current state of the video. For example, a cartoon character for a man at beach may be associated with the following metadata tags: "character," "cartoon", "2D", "man "beach," "summer," and "travel." These metadata tags are system-defined attributes.

One or more of the Asset Identification Modules 130 may also identify any user-defined attributes 135 for an audio track generation request. The Asset Identification Modules may use a natural language understanding (NLU) model 145 to process natural language audio track generation requests.

The system includes an Audio Track Generation Platform 150 with an Audio Track Generation Module 160. The system-defined attributes of assets in the current state, as well as any user-defined attributes for the desired audio track, are inputted into the Audio Track Generation Module 160. In one embodiment, the system-defined attributes for each assets include metadata tags associated with the asset, the scene in which an asset resides, the asset position within a scene, the asset size in the scene, and the timeline associated with the scene. In response to receiving the aforementioned input, the Audio Track Generation Module provides an audio track 180 for the scene 120 in the video. The audio track may include music, dialog, sound effects, and/or environmental noise.

Figure 3:
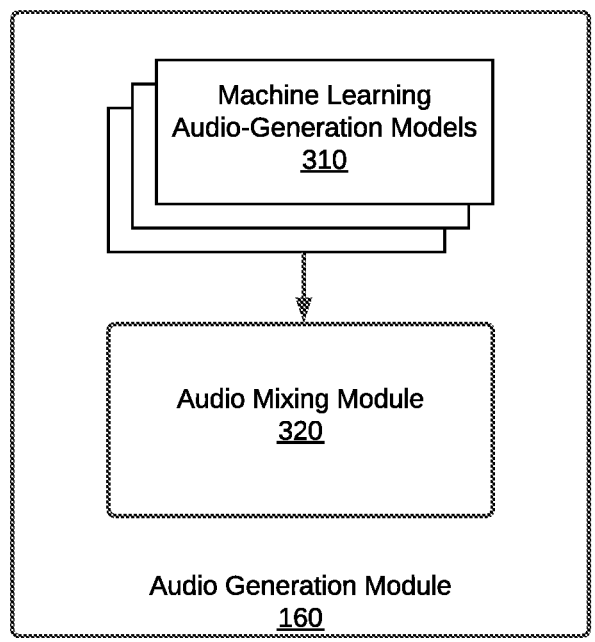
FIG. 3 is a block diagram that illustrates a machine-learning module for automatic audio track generation.

FIG. 3 illustrates an example of the Audio Generation Module 160 in more detail. The Audio Generation Module 160 includes a plurality of machine-learning models 310 that are trained to produce different types of audio in response to receiving input data 170a-170d. For example, if one of the assets in scene 120 is a dog, one of the models 310 may produce a barking sound. The models 310 may produce multiple audio clips for the scene based on the assets in the scene. If more than one audio clip is produced for a scene by models 310, Audio Mixing Module 320 intelligently mixes the audio clips to create an audio track for the scene. In one embodiment, Audio Mixing Module 320 is trained to mix the clips based on a library of high-quality video with audio tracks. The Audio Mixing Module 320 may also follow prescribed rules for mixing the audio based on the position and relative size of the assets in the scene for which audio clips were generated. If the user uploads an audio clip to the video, then this audio clip is mixed in with the machine-generated audio clips.

In certain embodiments, the User Interface 110 for the video production system is generated on client computers, and the Audio Track Generation Platform 150 runs on a backend server. The client computers send audio track generation requests via an API over the Internet or other network. Also, some of the machine learning models in the Audio Track Generation Platform may run locally on a client computer, and others may run on the backend server.

Data may be transferred between client computers and the backend server using JSON format. For the example, if one of the assets in the video scene is a 3D woman in an office scene, the system-defined attributed could expressed in JSON format as follows:

"system_defined_attribute": "character, image, woman, office, 3D, glasses",
"id": "1",
"data": "<encoded>"}

The "id" corresponds to a unique ID for each asset in the video production workspace.

4. Method for Automatic Audio Track Generation

Figure 2A:
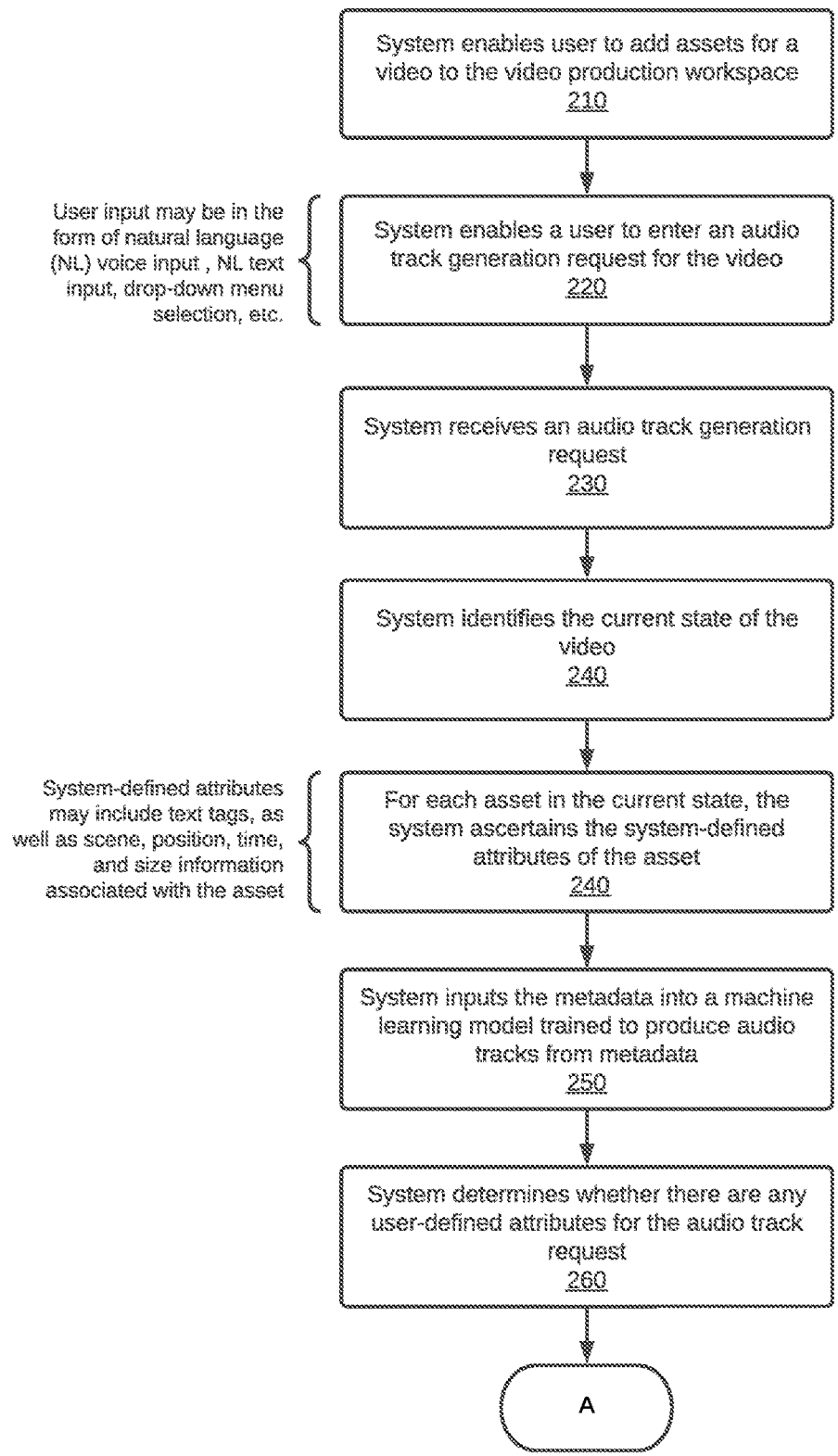
FIGS. 2A-B are flowcharts that illustrate a method, according to one embodiment, for automatically generating an audio track for a video based on a current state of the video.
Figure 2B:
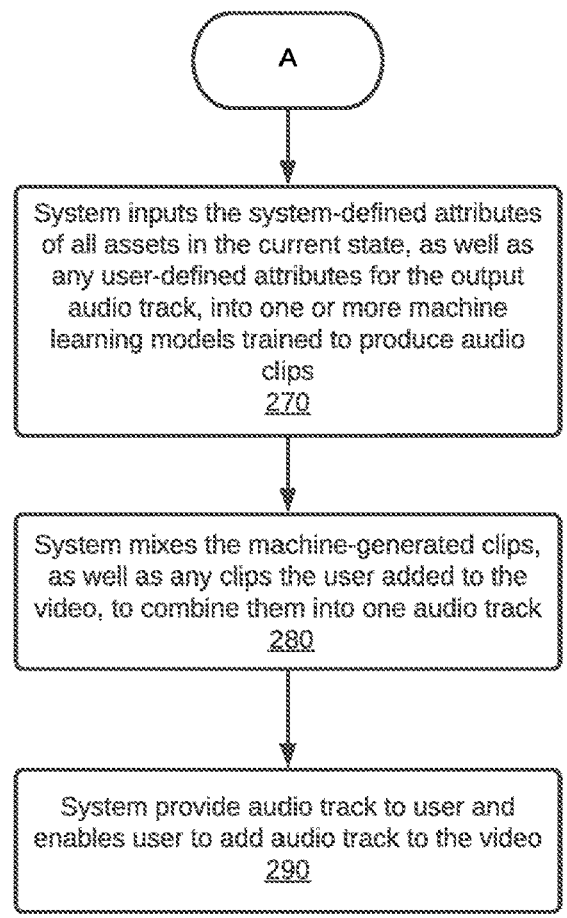

FIGS. 2A-B illustrate a method for automatically generating audio tracks for a video based on a current state of the video.

The system enables a user to add assets for a video to the video production workspace (step 210). The user is able to add a number of different multimedia types to the video productions workspace, including text, images, video clips, and animations. These may come in form of characters, props, backgrounds, etc.

The system enables a user to enter an audio track generation request for the video (step 220). In certain embodiments, the user is able to speak or type a natural language request for an audio track into the system. The user may or may not specify specific attributes for the audio track. In the other embodiments, the system may present the user with a menu (e.g., a drop down menu) with various audio track options.

When the system receives an audio track generation request for a selected asset (step 230), the system ascertains a current state of the video (step 240). In one embodiment, this includes identifying the scenes in the current state and identifying the assets within each scene, as well as the timeline associated with each scene. For each asset in the current state, the system retrieves the system-defined attributes associated with the asset, such as the metadata tags associated with the assets, the scene in which the asset is in, the position of the asset within a scene, the timeline associated with the scene, and asset size dimensions (step 250). Images or video clips uploaded by a user may not initially have associated metadata tags. In such case, the system may infer attributes of the asset using computer vision techniques to identify and classify elements in the uploaded clip. The system may also infer attributes from the title of a video clip (e.g., "cat.mp4'). The inferred attributes are treated as system-defined attributes.

The system also determines whether there are any user-defined attributes for the audio track request (step 260). In requesting an audio track, the user may specify certain attributes for the audio track, such as "include distant rumbling thunder sound." In embodiments where a user is able to enter natural language requests for an audio track, the system uses a natural language understanding (NLU) model to process the request and derive any attributes the user is requesting for the audio track to be generated (i.e., it derives the user's intent).

The system then inputs the system-defined attributes of all the assets in the current state of the video, as well as any user-defined attributes for the output audio, into one or more machine learning models trained to produce audio clips from the input data (step 270). In embodiments where there is more than one audio-generation model, the system identifies which audio-generation models should be used to generate the audio track. In one embodiment, a look-up table may specify the applicable models based on the input data. The system mixes the clips produces by the audio-generation models to combine them into one audio track (step 280). For example, the clips may be combined in accordance with the order and time in which the assets associated with the clips appear in the video. The system presents the generated audio track to the user via user interface 110 and enables the user to add the audio track to the scene (step 290). Before adding the audio track to the scene, the user is able to further refine the soundtrack by requesting further refinements (e.g., "make the dog barking sound seem more distant," "make the character's voice deeper," and "add distant bird chirping sounds.") These additional user-defined attributes are inputted into the audio-generation machine learning models to further refine the soundtrack.

4. Training the Machine Learning Asset Enhancement Modules

The audio generation models may be trained using deep learning, auto encoders, transformers, and other machine learning techniques. In one embodiment, certain models use transformer architectures trained on phrase-image pairs and hence both an image and text can be passed into the models as parameters.

An audio generation model that produces background music, may be trained on many different video tracks. The model can generate music that matches the video by identifying patterns in the current state of the video that are similar to patterns in its training data set. The music produced can be mixed with the other machine-generated sounds effects over one or more tracks.

5. Alternate Embodiment

In certain embodiment, the system may recommend the addition of an audio track to the user. In such embodiment, the system automatically generates an audio track without receiving a request from the user. In such embodiment, the system monitors the current state of the video and uses a machine learning model to predict when audio should be added to the video. The machine learning model may be trained on a large library of high-quality video to learn best practices in video production. When the system predicts that audio should be added to the video, it automatically generates an audio track and suggests incorporating the audio track to the user.

6.0 General

The methods described with respect to FIGS. 1-3 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention.

The invention claimed is:

1. A method, performed by a computer system, for automatically generating an audio track for a video based on a current state of the video, the method comprising:
   providing a multimedia video production workspace for creating videos;
   enabling a user to add a plurality of multimedia assets for a video to the multimedia workspace;
   providing an audio-track generation platform comprising a plurality of machine-learning models trained to generate audio clips in response to receiving attributes of assets in the video production workspace; and
   automatically generating an audio track for a video based on a current state of the video by performing the following:
      identifying a current state of a video, including identifying all the assets in the current state of the video;
      identifying attributes of the assets in the current state;
      identifying one or more machine learning models in the audio-track generation platform to use to generate the audio track;
      applying the identified machine-learning model(s) to the attributes of the assets in the current state to obtain a plurality of audio clips corresponding to the assets in the current state;
      mixing the plurality of audio clips to create an audio track for the video;
      presenting the audio track to the user; and
      enabling the user to add the audio track to the video.

2. The method of claim 1, further comprising:
   enabling a user to enter an audio track generation request in the video production workspace, wherein the audio track is automatically generated in response to receiving the audio track generation request from a user.

3. The method of claim 2, wherein the user is able to enter a natural language audio track generation request.

4. The method of claim 2, further comprising:
identifying user-defined attributes from the audio track generation request; and
applying the identified machine-learning model(s) to the user-defined attributes for the audio track in addition to the system-defined attributes for the assets in the current state.

5. The method of claim 1, wherein the system-defined attributes of an asset include metadata tags for the asset, one or more scenes associated with the asset, an asset position, an asset size, and timeline data associated with the asset.

6. The method of claim 1, wherein identifying attributes of the assets in the current state of the video comprising using a computer vision model to classify a visual asset in the video with one or more attributes.

7. A system for automatically generating an audio track for a video based on a current state of the video, the system comprising:
one or more processors;
one or more memory units coupled to the one or more processors, wherein the one or more memory units store instructions that, when executed by the one or more processors, cause the system to perform the operations of:
providing a multimedia video production workspace for creating videos;
enabling a user to add a plurality of multimedia assets for a video to the multimedia workspace;
providing an audio-track generation platform comprising a plurality of machine-learning models trained to generate audio clips in response to receiving attributes of assets in the video production workspace; and
automatically generating an audio track for a video based on a current state of the video by performing the following:
identifying a current state of a video, including identifying all the assets in the current state of the video;
identifying attributes of the assets in the current state;
identifying one or more machine learning models in the audio-track generation platform to use to generate the audio track;
applying the identified machine-learning model(s) to the attributes of the assets in the current state to obtain a plurality of audio clips corresponding to the assets in the current state;
mixing the plurality of audio clips to create an audio track for the video;
presenting the audio track to the user; and
enabling the user to add the audio track to the video.

8. The system of claim 7, further comprising:
enabling a user to enter an audio track generation request in the video production workspace, wherein the audio track is automatically generated in response to receiving the audio track generation request from a user.

9. The system of claim 8, wherein the user is able to enter a natural language audio track generation request.

10. The system of claim 8, further comprising:
identifying user-defined attributes from the audio track generation request; and
applying the identified machine-learning model(s) to the user-defined attributes for the audio track in addition to the system-defined attributes for the assets in the current state.

11. The system of claim 7, wherein the system-defined attributes of an asset include metadata tags for the asset, one or more scenes associated with the asset, an asset position, an asset size, and timeline data associated with the asset.

12. The system of claim 7, wherein identifying attributes of the assets in the current state of the video comprising using a computer vision model to classify a visual asset in the video with one or more attributes.

13. A non-transitory computer-readable medium comprising a computer program, that, when executed by a computer system, enables the computer system to perform the following method for automatically generating an audio track for a video based on a current state of the video, the method comprising:
providing a multimedia video production workspace for creating videos;
enabling a user to add a plurality of multimedia assets for a video to the multimedia workspace;
providing an audio-track generation platform comprising a plurality of machine-learning models trained to generate audio clips in response to receiving attributes of assets in the video production workspace; and
automatically generating an audio track for a video based on a current state of the video by performing the following:
identifying a current state of a video, including identifying all the assets in the current state of the video;
identifying attributes of the assets in the current state;
identifying one or more machine learning models in the audio-track generation platform to use to generate the audio track;
applying the identified machine-learning model(s) to the attributes of the assets in the current state to obtain a plurality of audio clips corresponding to the assets in the current state;
mixing the plurality of audio clips to create an audio track for the video;
presenting the audio track to the user; and
enabling the user to add the audio track to the video.

14. The non-transitory computer-readable medium of claim 13, further comprising:
enabling a user to enter an audio track generation request in the video production workspace, wherein the audio track is automatically generated in response to receiving the audio track generation request from a user.

15. The non-transitory computer-readable medium of claim 14, wherein the user is able to enter a natural language audio track generation request.

16. The non-transitory computer-readable medium of claim 14, further comprising:
identifying user-defined attributes from the audio track generation request; and
applying the identified machine-learning model(s) to the user-defined attributes for the audio track in addition to the system-defined attributes for the assets in the current state.

17. The non-transitory computer-readable medium of claim 13, wherein the system-defined attributes of an asset include metadata tags for the asset, one or more scenes associated with the asset, an asset position, an asset size, and timeline data associated with the asset.

18. The non-transitory computer-readable medium of claim 13, wherein identifying attributes of the assets in the current state of the video comprising using a computer vision model to classify a visual asset in the video with one or more attributes.

* * * * *